Aug. 15, 1961 A. B. BOYD 2,996,688

FREQUENCY SELECTIVE CIRCUIT WITH ANGULAR OSCILLATION DEVICE

Filed July 2, 1958 2 Sheets-Sheet 1

INVENTOR.
Anderson B. Boyd
BY
Paul J. Ellington
ATTORNEY

FREQUENCY SELECTIVE CIRCUIT WITH ANGULAR OSCILLATION DEVICE

Filed July 2, 1958 2 Sheets-Sheet 2

INVENTOR.
Anderson B. Boyd
BY
Paul J. Ethington
ATTORNEY

United States Patent Office 2,996,688

Patented Aug. 15, 1961

2,996,688

FREQUENCY SELECTIVE CIRCUIT WITH ANGULAR OSCILLATION DEVICE

Anderson B. Boyd, Milwaukee, Wis., assignor to General Motors Corporation, Detroit, Mich., a corporation of Delaware

Filed July 2, 1958, Ser. No. 746,234
7 Claims. (Cl. 333—71)

This invention relates to frequency selective circuits of the type using a mechanically resonant member for determining the selected frequency.

Frequency selective circuits have been devised in which a vibratile element operates in conjunction with a single coil which serves to drive the vibratile element and acts as variable impedance in the circuit. The magnitude of the impedance is a function of the frequency of the current energizing the coil and provides a selectivity characteristic corresponding to that of the vibratile element. When this arrangement is connected as one arm of a bridge, the circuit affords excellent frequency stability with a very high "Q" or selectivity but at frequencies removed from the resonant frequency the attenuation approaches a constant limiting value. Additionally, the sensitivity is limited and a balancing coil is required in the bridge circuit.

The invention set forth in my copending patent application Serial No. 699,771 entitled "Frequency Selective Circuit," filed November 29, 1957, obviates these difficulties by utilizing the phenomena of motional impedance to provide push-pull action in a bridge circuit. This is accomplished by the arrangement of coils in adjacent arms of the bridge so as to provide a common field in which a single, mechanically resonant element may vibrate. In addition to increased sensitivity, this arrangement also provides attenuation which approaches an infinite value at frequencies remote from the resonant frequency. The present invention is an improvement of that in the above-mentioned patent application in that it utilizes an electromagnetic device to produce harmonic angular oscillations and provides electrical means for precise frequency adjustment.

A more complete understanding of this invention may be had from the detailed description which follows taken with the accompanying drawings in which.

Figure 1:
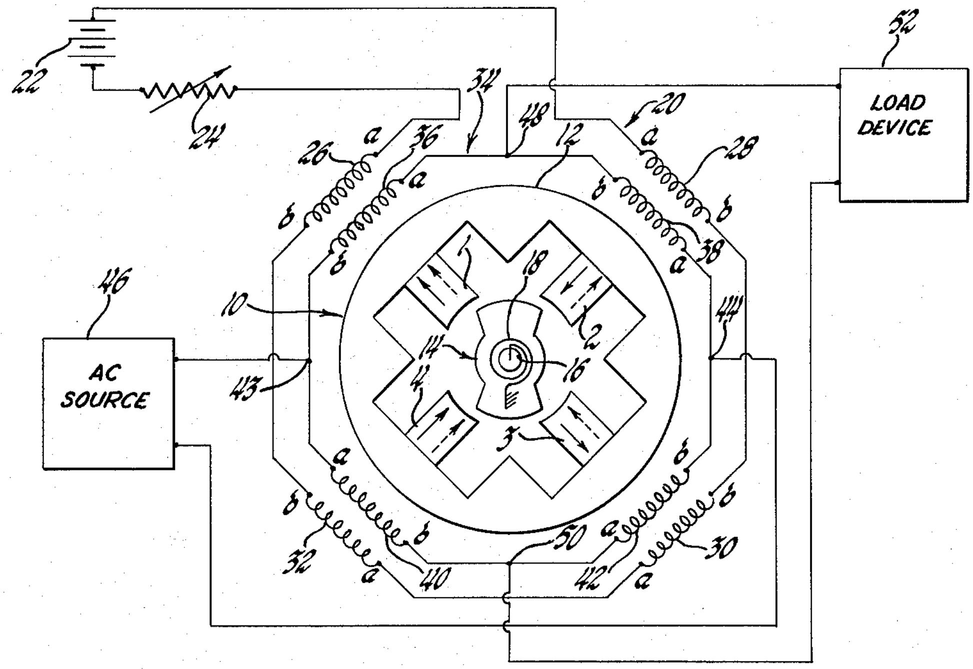
FIGURE 1 is a diagram of the frequency selective circuit.
Figure 2:
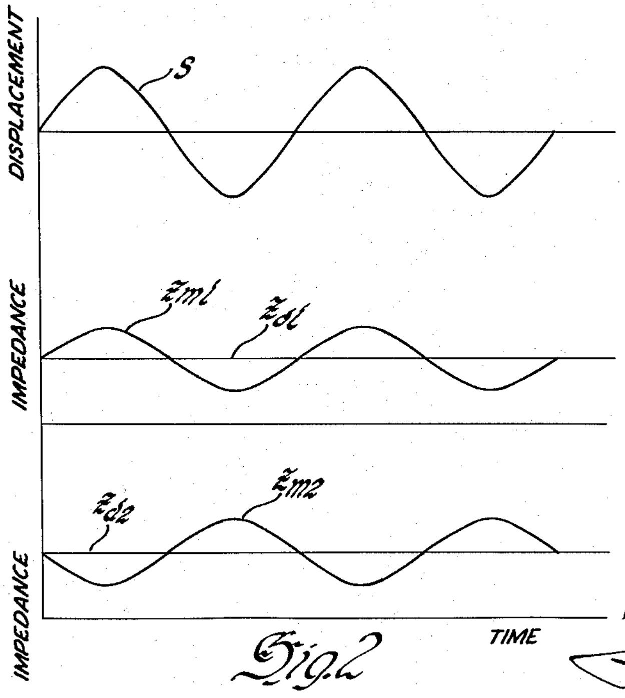
FIGURE 2 shows the phase relationship of variations in displacement and impedance in the system.

Referring now to the drawings, there is shown in FIGURE 1 an illustrative embodiment of the invention in a frequency selective circuit of general application. The mechanically resonant member comprises an electromagnetic device which takes the form of a rotary microsyn with provisions for preventing magnetic interaction of the poles. The microsyn comprises a stator 10 with a housing or frame 12 which is generally circular in configuration and constructed of non-magnetic material. The stator has four re-entrant poles, suitably constructed of a stack of laminations of magnetic material, numbered consecutively 1 through 4, each of which terminates in a pole face which forms a circular arc in cross section. The rotor 14 is mounted for angular oscillation concentrically with the pole faces of the stator and is likewise constructed of a stack of laminations of magnetic material. The rotor is provided with diametrically opposite arcuate pole faces which span a distance between the center lines of adjacent stator pole faces and which provide a uniform air gap in the magnetic circuit between the rotor and the stator.

The angular oscillations of the rotor are accommodated by any conventional rotor suspension 16 such as a torsion wire or bearings. A restoring torque which varies linearly with the displacement angle of the rotor from its reference position is imparted to the rotor by either mechanical or electrical means or a combination thereof. A mechanical restoring torque is developed by the torsion spring 18 interposed between the rotor and stator and which may be integral with or separate from the rotor suspension. An electrical restoring torque is developed by a stator excitation winding in the form of a microsyn elastic restraint generator winding which will be described presently.

To facilitate description of the windings, a convention is adopted to indicate the relative direction of the windings by representation of the magnetomotive force patterns at a given instant of time. Each coil has one end designated *a* and its other end designated *b* and the coil has a winding sense on its pole such that current flow from *a* to *b* produces an inwardly directed flux and the current flow from *b* to *a* produces an outwardly directed flux. The direction of a direct or unidirectional component of flux is indicated by the solid line arrows on the poles and the direction of an alternating component of flux at a given instant of time is indicated by the dashed-line arrows on the poles.

The rotor is provided with a restoring torque by an excitation winding 20 disposed upon the stator poles and energized from a direct voltage source 22 through a variable resistor 24. The winding 20 includes coils 26, 28, 30, 32 in series connection and disposed on poles 1, 2, 3, and 4 respectively with the winding sense indicated. The restoring torque developed by the winding 20 is a linear function of angular displacement of the rotor and the excitation current and hence may be accurately adjusted by the variable resistor 24. The rotor will have a mechanical resonance frequency determined by its moment of inertia and the sum of the mechanical and electrical restoring torques.

An additional excitation winding 34 is disposed on the stator and includes coils 36, 38, 40, and 42 on poles 1, 2, 4, and 3 respectively with the winding sense indicated. The winding 34 has input terminals 43 and 44 adapted for connection with an alternating voltage source 46 and output terminals 48 and 50 for connection with a load device 52. Thus the coils are connected in a bridge circuit with coils 36 and 38 forming one pair of conjugate arms and the coils 40 and 42 forming the other pair of conjugate arms. It is noted that the torques exerted on the rotor due to the excitation winding 34 at poles 1 and 2 are in opposite directions and at poles 3 and 4 are in opposite directions.

Figure 4:
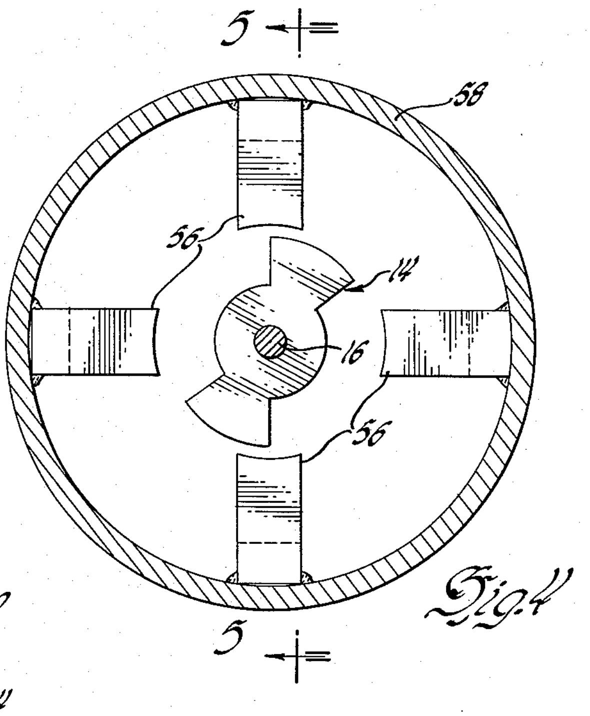
FIGURES 4 and 5 show a modified microsyn structure.
Figure 5:
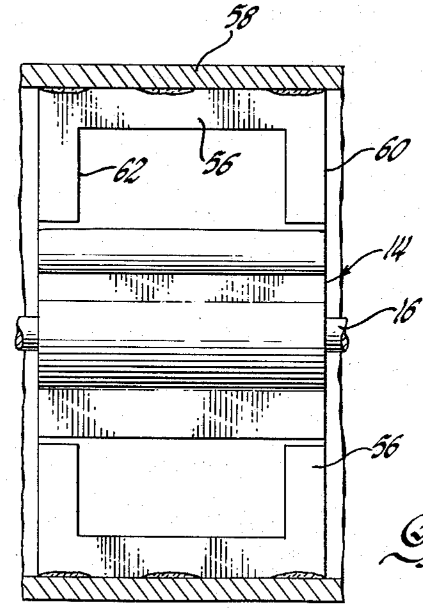

Before considering the operation of the invention, an alternative construction of the microsyn stator for preventing magnetic interaction of the poles will be described with reference to FIGURES 4 and 5. The stator comprises four symmetrically arranged pole members 56 supported in a housing or frame 58. Each pole member is of U-shape and formed of a stack of laminations of magnetic material. The pole member includes two axially displaced pole pieces 60 and 62 with an arcuate pole face opposite the rotor forming an air gap therewith. The pole member supports excitation coils (not shown) on either the pole pieces or the axially extending portion therebetween and each pole member forms, with the rotor, a magnetic circuit which is independent from that of the other pole members.

When a mechanically resonant member is subjected to the magnetic field of a coil energized with an alternating current, the impedance of the coil may be treated as having two components. One component is the damped impedance which has a value equal to the impedance of the coil with the mechanically resonant member at rest in its reference position. The other component is the motional impedance which is developed by virtue of the motion of the mechanically resonant member in the magnetic field of the coil. The motional impedance component may be considered to be alternating at the frequency of vibration of the resonant member and effectively causes the total impedance of the coil to vary as a function of time about the damped impedance value. The motional impedance component is developed from the self-induction variation of the coil resulting from the positional variation of the resonant member in the magnetic field of the coil. It will be appreciated that the instantaneous value of the inductance of the coil is smaller or greater than that corresponding to the damped impedance depending upon whether the resonant member is displaced from the coil more or less than the reference position.

The operation of the invention will be explained by considering the relationship of positional variation of rotor 14 to the impedance variation in the pair of coils 36 and 38. With the rotor 14 at rest in its reference position, the coil 36 has a constant value of impedance or a damped impedance value $Z_{d1}$ and the coil 38 has damped impedance of constant value $Z_{d2}$. When the coils 36 and 38 are energized with an alternating current at the resonant frequency of the rotor 14, the positional variation is represented by the curve S which illustrates the displacement from the reference position as being a sinusoidal function of time. As the rotor 14 approaches and departs from the coil 36 during its first half cycle of motion, the instantaneous value of inductance and the motional impedance component $Z_{m1}$ increases from zero to a positive maximum value and then decreases to zero. As indicated, the motional impedance value is added algebraically to the damped impedance value. During the next half cycle, the motional impedance component $Z_{m1}$ varies from zero value through a negative maximum value with the positional variation of the rotor 14 on the other side of the reference position. The instantaneous value of inductance and motional impedance $Z_{m2}$ of the coil 38 is varied by the positional variation of the rotor 14 in the same manner but in opposite phase as represented by the motional impedance curve $Z_{m2}$.

When an excitation voltage, applied to the input terminals, is remote from the resonant frequency, the rotor is at rest in its reference position and all of the coils have equal values of damped impedances and the bridge circuit is balanced. Under this condition of operation the voltage appearing at the output terminals is sensibly zero. When the voltage applied to the input terminals has a frequency equal to the resonant frequency, the motional impedance components of the impedance presented by coils 36 and 38 vary in opposite phase and, accordingly, the bridge is unbalanced. Similarly, the motional impedance components of the coils 40 and 42 vary in opposite phase contributing further to the unbalance of the bridge. Thus, Similarly, a highly selective frequency rejection circuit with little attenuation and a large output voltage appears at the output terminals.

Figure 3:
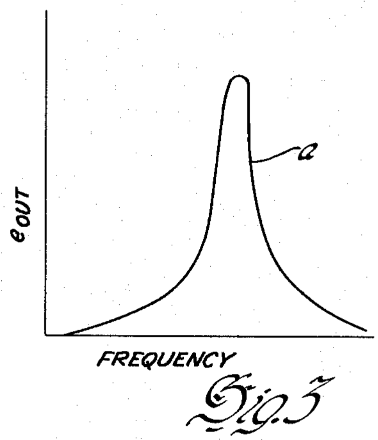
FIGURE 3 is a response curve of a typical circuit.

As shown by the response curve of FIGURE 3 for an input signal voltage of given amplitude, the output voltage varies as a function of frequency with a peak response at the mechanical resonance of the rotor. As previously discussed, the resonant frequency is determined by the sum of the mechanical and electrical restoring torques and may be established readily and accurately by adjustment of the excitation current in winding 20. As the input frequency decreases or increases from resonance, the output voltage decreases sharply and approaches the zero value in an asymptotic manner. Numerous applications of the circuit having this characteristic will be apparent. The most obvious example is a simple frequency selective filter in which only the frequency of resonance is translated from the input terminals to the output terminals. The circuit may also be used as the frequency determining component in an oscillator wherein the frequency selective circuit is connected to supply regenerative feedback. Similarly, a highly selective frequency rejection circuit may be realized by connecting this inventive circuit in the degenerative feedback path of an amplifier.

Although this invention has been described with respect to a particular embodiment, such description is not to be construed in a limiting sense. Numerous modifications and variations within the spirit and scope of the invention will now occur to those skilled in the art. For a definition of the invention, reference is made to the appended claims.

I claim:

1. A frequency selective circuit comprising an electromagnetic device with a stator having four symmetrically arranged poles, a rotor of magnetic material mounted for angular oscillation within said stator and having a reference position in alignment with an axis of symmetry of the stator, means for imparting a restoring torque to said rotor corresponding to its angular displacement from the reference position, said rotor having a mechanical resonance frequency determined by its inertia and the magnitude of the restoring torque, an excitation winding on the stator including a coil on each pole, said coils being connected in a bridge circuit with a different coil in each arm of the bridge circuit, an alternating voltage source connected across one pair of diagonally opposite terminals of the bridge circuit and a load device connected across the other pair of diagonally opposite terminals of the bridge circuit.

2. A frequency selective circuit comprising an electromagnetic device with a stator having four symmetrically arranged poles, a rotor of magnetic material mounted for angular oscillation within said stator and having a reference position in alignment with an axis of symmetry of the stator, means for imparting a restoring torque to said rotor corresponding to its angular displacement from the reference position, said rotor having a mechanical resonance frequency determined by its inertia and the magnitude of the restoring torque, an excitation winding on the stator including a coil on each pole, said coils being connected in a bridge circuit with a different coil in each arm of the bridge circuit, an alternating voltage source connected across one pair of diagonally opposite terminals of the bridge circuit, said coils having a winding sense producing a magnetomotive force pattern in which flux is directed inwardly in one pole and outwardly in the opposite pole, the coils on opposite poles being connected in opposite arms of the bridge circuit whereby the rotor oscillates at its resonance frequency when the alternating voltage of said source includes a component of said frequency, and a load device connected across the other pair of diagonally opposite terminals of the bridge circuit.

3. A frequency selective circuit comprising an electromagnetic device with a stator having four symmetrically arranged poles, a rotor of magnetic material mounted for angular oscillation within said stator and having a reference position in alignment with an axis of symmetry of the stator, a restoring torque winding on the stator including a coil on each pole, a direct voltage source connected across the series connection of said coils to impart a restoring torque to the rotor corresponding to its angular displacement from the reference position, said rotor having a mechanical resonance frequency determined by its inertia and the magnitude of the restoring torque, an excitation winding on the stator including a coil on each pole, said coils being connected in a bridge circuit with a different coil in each arm of the bridge circuit, an alternating voltage source connected across one pair of diagonally opposite terminals of the bridge circuit and a load device connected across the other pair of diagonally opposite terminals of the bridge circuit.

4. A frequency selective circuit comprising an electromagnetic device with a stator having four symmetrically arranged poles, a rotor of magnetic material mounted for angular oscillation within said stator and having a reference position in alignment with an axis of symmetry of the stator, a torsion spring interposed between the stator and rotor for imparting a restoring torque to the rotor, a restoring torque winding on the stator including a coil on each pole, a direct voltage source connected across the series connection of said coils, said rotor having a resonance frequency determined by the sum of said restoring torques, means for adjusting the current flow in said restoring torque winding, an excitation winding on the stator including a coil on each pole, said coils being connected in a bridge circuit with a different coil in each arm of the bridge circuit, an alternating voltage source connected across one pair of diagonally opposite terminals of the bridge circuit and a load device connected across the other pair of diagonally opposite terminals of the bridge circuit.

5. A frequency selective circuit comprising an electromagnetic device with a stator having four symmetrically arranged poles, a rotor of magnetic material mounted for angular oscillation within said stator and having a reference position in alignment with an axis of symmetry of the stator, a restoring torque winding on the stator including a coil on each pole, a direct voltage source, said coils being connected in series across the direct voltage source to produce a magnetomotive flux pattern in which the flux is directed alternately outwardly and inwardly through the poles to produce a restoring torque on the rotor corresponding to its angular displacement from the reference position, said rotor having a mechanical resonance frequency determined by its inertia and the magnitude of the restoring torque, an excitation winding on the stator including a coil on each pole, the coils of the excitation winding being connected in a bridge circuit with each coil in a different arm of the bridge circuit, an alternating voltage source connected across one pair of diagonally opposite terminals of the bridge circuit, the coils of the excitation winding producing a magnetomotive force pattern in which flux is directed oppositely through opposite poles and through diagonally opposite coils of the bridge circuit, whereby the rotor oscillates at its resonance frequency when the voltage of said alternating voltage source is at the resonance frequency, and a load device connected across the other pair of diagonally opposite terminals of the bridge circuit.

6. A frequency selective circuit comprising an electromagnetic device with a stator having four symmetrically arranged poles of magnetic material, non-magnetic support means for said poles, a rotor of magnetic material mounted for angular oscillation within said stator and having a reference position in alignment with an axis of symmetry of the stator, means for imparting a restoring torque to said rotor corresponding to its angular displacement from the reference position, said rotor having a mechanical resonance frequency determined by its inertia and the magnitude of the restoring torque, an excitation winding on the stator including a coil on each pole, said coils being connected in a bridge circuit with a different coil in each arm of the bridge circuit, an alternating voltage source connected across one pair of diagonally opposite terminals of the bridge circuit and a load device connected across the other pair of diagonally opposite terminals of the bridge circuit.

7. A frequency selective circuit comprising an electromagnetic device with a stator having four symmetrically arranged pole members, each pole member being of magnetic material and including a pair of axially displaced pole pieces, a non-magnetic support means for said pole members, a rotor of magnetic material mounted for angular oscillation within said stator and providing a magnetic circuit path between the pair of pole pieces of each pole member, said rotor having an angular reference position in alignment with an axis of symmetry of the stator, means for imparting a restoring torque to said rotor corresponding to its angular displacement from the reference position, said rotor having a mechanical resonance frequency determined by its inertia and the magnitude of the restoring torque, an excitation winding on the stator including a coil on each pole, said coils being connected in a bridge circuit with a different coil in each arm of the bridge circuit, an alternating voltage source connected across one pair of diagonally opposite terminals of the bridge circuit and a load device connected across the other pair of diagonally opposite terminals of the bridge circuit.

References Cited in the file of this patent

UNITED STATES PATENTS

| | | |
|---|---|---|
| 2,050,165 | Davies | Aug. 4, 1936 |
| 2,112,560 | Davies | Mar. 29, 1938 |
| 2,435,487 | Adler | Feb. 3, 1948 |
| 2,630,482 | Bostwick | Mar. 3, 1953 |
| 2,660,712 | Landon | Nov. 24, 1953 |
| 2,758,288 | Shannon et al. | Aug. 7, 1956 |
| 2,815,477 | Dunn et al. | Dec. 3, 1957 |
| 2,842,749 | Bonnell | July 8, 1958 |
| 2,882,484 | Swainson | Apr. 14, 1959 |

UNITED STATES PATENT OFFICE

CERTIFICATION OF CORRECTION

Patent No. 2,996,688 August 15, 1961

Anderson B. Boyd

It is hereby certified that error appears in the above numbered patent requiring correction and that the said Letters Patent should read as corrected below.

Column 3, line 58, strike out "Similarly, a highly selective frequency rejection circuit" and insert instead -- the input signal voltage is translated by the bridge circuit --.

Signed and sealed this 3rd day of April 1962.

(SEAL)
Attest:

ERNEST W. SWIDER
Attesting Officer

DAVID L. LADD
Commissioner of Patents